United States Patent
Chiba

(10) Patent No.: US 8,629,990 B2
(45) Date of Patent: Jan. 14, 2014

(54) IMAGE FORMING APPARATUS FOR IDENTIFYING AN UNKNOWN TERM IN A DOCUMENT

(75) Inventor: Tetsuroh Chiba, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 148 days.

(21) Appl. No.: 13/401,256

(22) Filed: Feb. 21, 2012

(65) Prior Publication Data

US 2012/0212756 A1 Aug. 23, 2012

(30) Foreign Application Priority Data

Feb. 22, 2011 (JP) ................................. 2011-035509

(51) Int. Cl.
*G06K 15/02* (2006.01)
*G06F 3/12* (2006.01)

(52) U.S. Cl.
USPC .......................... 358/1.11; 358/1.15; 358/402

(58) Field of Classification Search
USPC ............... 358/1.1, 1.9, 1.14, 1.15, 1.16, 1.18, 358/402; 709/200
See application file for complete search history.

(56) References Cited

U.S. PATENT DOCUMENTS

| 5,729,618 | A | 3/1998 | Fujisawa et al. |
| 7,146,415 | B1 * | 12/2006 | Doi .............................. 709/224 |
| 7,519,226 | B2 * | 4/2009 | Kaneda et al. ................. 382/224 |
| 8,514,462 | B2 * | 8/2013 | Sohma et al. .................. 358/448 |
| 2005/0105148 | A1 * | 5/2005 | Misawa ......................... 358/537 |
| 2007/0046988 | A1 | 3/2007 | Kasatani |
| 2010/0073701 | A1 | 3/2010 | Okada et al. |
| 2010/0171999 | A1 * | 7/2010 | Namikata et al. ............. 358/530 |
| 2010/0232690 | A1 * | 9/2010 | Kanatsu et al. ............... 382/165 |
| 2010/0296736 | A1 * | 11/2010 | Shiiyama et al. ............. 382/195 |
| 2010/0299355 | A1 * | 11/2010 | Shiiyama et al. ............. 707/769 |

FOREIGN PATENT DOCUMENTS

| JP | 05-314175 | 11/1993 |
| JP | 07-200734 | 8/1995 |
| JP | 2006-133880 | 5/2006 |
| JP | 2006-331258 | 12/2006 |
| JP | 2007-067835 | 3/2007 |
| JP | 2010-074573 | 4/2010 |

* cited by examiner

*Primary Examiner* — Gabriel Garcia

(74) *Attorney, Agent, or Firm* — Edwards Wildman Palmer LLP; David G. Conlin; Steven M. Jensen

(57) ABSTRACT

An image forming apparatus enables meaning, a translation and an explanation of an unknown term or a term for which a translation is unknown in a document to be obtained easily while the meaning, the translation and the explanation of the term are left as a record, so that the record is able to be used afterwards, thereby increasing convenience for the user. An image reading portion reads a document image; a character recognition portion performs character recognition of a term included in the read document image; an information obtaining portion gains access to a website for performing dictionary search so as to obtain, as term information, information of a search result of the dictionary search performed with the recognized term as a keyword; and the image forming portion forms an image with term information including the term information and the document image based on the obtained term information.

4 Claims, 12 Drawing Sheets

IMAGE FORMING APPARATUS FOR IDENTIFYING AN UNKNOWN TERM IN A DOCUMENT

CROSS-NOTING PARAGRAPH

This non-provisional application claims priority under 35 U.S.C. §119(a) on Patent Application No. 2011-035509 filed in JAPAN on Feb. 22, 2011, the entire contents of which are hereby incorporated herein by reference.

FIELD OF THE INVENTION

The present invention relates to an image apparatus for forming an image.

BACKGROUND OF THE INVENTION

With the recent development of the Internet, various information is able to be easily obtained from a website released on the Internet. Then, in order to use such information which is on the Internet, various devices equipped with connection functions to the Internet have been developed.

For example, Japanese Laid-Open Patent Publication No. 2010-74573 discloses an MFP (Multi Function Peripheral) which is connectable to the Internet. The MFP extracts a web address included in a document image and obtains web page information corresponding to the web address. The MFP then generates an index showing a correspondence relation between the document image and the web page information.

However, when a user wishes to know meaning, a translation and an explanation of a term included in a scanned document, the conventional art of the Japanese Laid-Open Patent Publication No. 2010-74573 as described above is not to provide the user with such information.

When there is an unknown term or a term for which a translation is unknown in the document, there arises a need for the user to use a dictionary to look up the term or to connect to the Internet with use of a computer to search and look up the term on a website, etc., providing a dictionary search service, thus requiring additional work. There is also inconvenience caused by that the searched results are not left behind unless a memo is taken or printing is performed.

SUMMARY OF THE INVENTION

An object of the present invention is to provide an image forming apparatus capable of increasing convenience for a user, in which when there is an unknown term or a term for which a translation is unknown in a document, meaning, a translation and an explanation of the term are able to be obtained easily, while the meaning, the translation and the explanation of the term are left as a record, thereby making it possible to use the record afterward, and the like.

An object of the present invention is to provide an image forming apparatus for forming an image, comprising: an image reading portion for reading a document image; a character recognition portion for performing character recognition of a term included in the document image read by the image reading portion; an information obtaining portion for gaining access to a website for performing dictionary search through a network so as to obtain, as term information, information of a search result of the dictionary search performed with the term recognized by the character recognition portion as a keyword; and an image forming portion for forming an image with term information including the term information and the document image based on the term information obtained by the information obtaining portion.

Another object of the present invention is to provide the image forming apparatus, wherein the information obtaining portion sets a term satisfying a condition specified by a user as the keyword.

Another object of the present invention is to provide the image forming apparatus, wherein the condition includes at least one of conditions including area specification, character string specification, typeface specification, character size specification, and character color specification of the term.

Another object of the present invention is to provide the image forming apparatus, further comprising: a storage portion for storing identification information for identifying a user and an address of the website in association with each other; and a user authentication portion for authenticating the user, wherein the information obtaining portion reads out the address of the website corresponding to the user authenticated by the user authentication portion from the storage portion, and gains access to the website based on the read address.

Another object of the present invention is to provide the image forming apparatus, wherein the image forming portion forms an image with term information that includes one page of the document image and the term information of the term included in the one page of the document image in one page.

PREFERRED EMBODIMENTS OF THE INVENTION

Figure 1A:
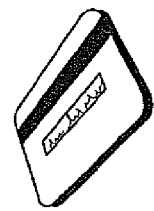
FIG. 1A to FIG. 1G are explanatory views for explaining an example of image forming processing according to the present invention.

The embodiments of the present invention will hereinafter be described in detail with reference to the drawings. FIG. 1A to FIG. 1G are explanatory views for explaining an example of image forming processing according to the present invention. First, in the image forming processing, user authentication is performed (FIG. 1A). The user authentication is performed for giving only an authenticated user permission to use an image forming apparatus. Furthermore, in the image forming apparatus, information of a URL of a website for performing dictionary search is registered in association with identification information for identifying a user. In the website, when a term is input as a search key word, term information including meaning, a translation or an explanation of the term is output as a search result. The above-described information of the URL is registered by a user in advance as the URL of the website for use in the above search. In the case where a user is authenticated as an authorized user for using the image forming apparatus, access to the website corresponding to the above URL is gained as will be described below.

Figure 1B:
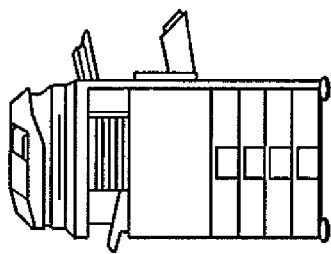
Figure 1C:
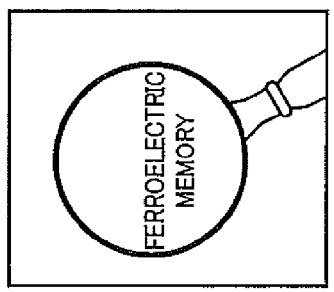

After user authentication, a document image is read by the image forming apparatus to perform character recognition (FIG. 1B). From among terms obtained by the character recognition, a term to be used as a keyword for dictionary search is then extracted (FIG. 1C). For extraction of the term, various extraction conditions are used. For example, there is a case where an important term is emphasized and described in a large character size as a headline of a document, and for extraction of such term, the character size is used as the extraction condition. Further, the important term is described in a special color or in a typeface in some cases, and for extraction of such a term, the character color or the typeface is used as the extraction condition. The term which satisfies such an extraction condition is then extracted and the extracted term is set as a keyword for dictionary search.

Figure 1D:
Figure 1E:
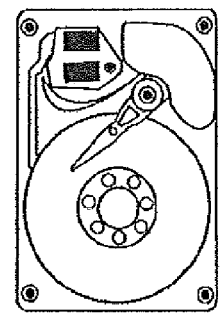

The image forming apparatus subsequently obtains the information of the URL registered in association with the user authenticated by the user authentication in FIG. 1A, and gains access to a website corresponding to the URL to perform dictionary search using the extracted keyword (FIG. 1D). The image forming apparatus then stores term information obtained as the result of the dictionary search in a storage device (FIG. 1E).

Figure 1F:
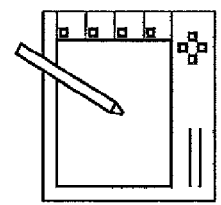
Figure 1G:
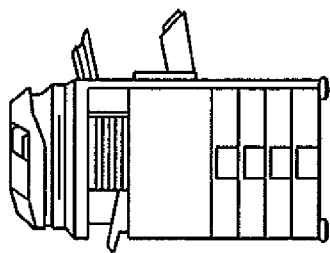

Thereafter, the image forming apparatus receives a process instruction of the term information from a user (FIG. 1F). For example, in a case where the user removes excess information included in the obtained term information, the image forming apparatus receives an instruction to remove the information from the user. The image forming apparatus then generates an image with term information including the document image read in FIG. 1B and the term information obtained as the result of the dictionary search or the term information from which the excess information is removed and prints the generated image with term information (FIG. 1G).

Thereby, when there is an unknown term or a term for which a translation is unknown in a document, meaning, a translation and an explanation of the term are able to be obtained easily while the meaning, the translation and the explanation of the term are left as a record, so that the record is able to be used afterward, thereby increasing convenience for the user.

Figure 2:
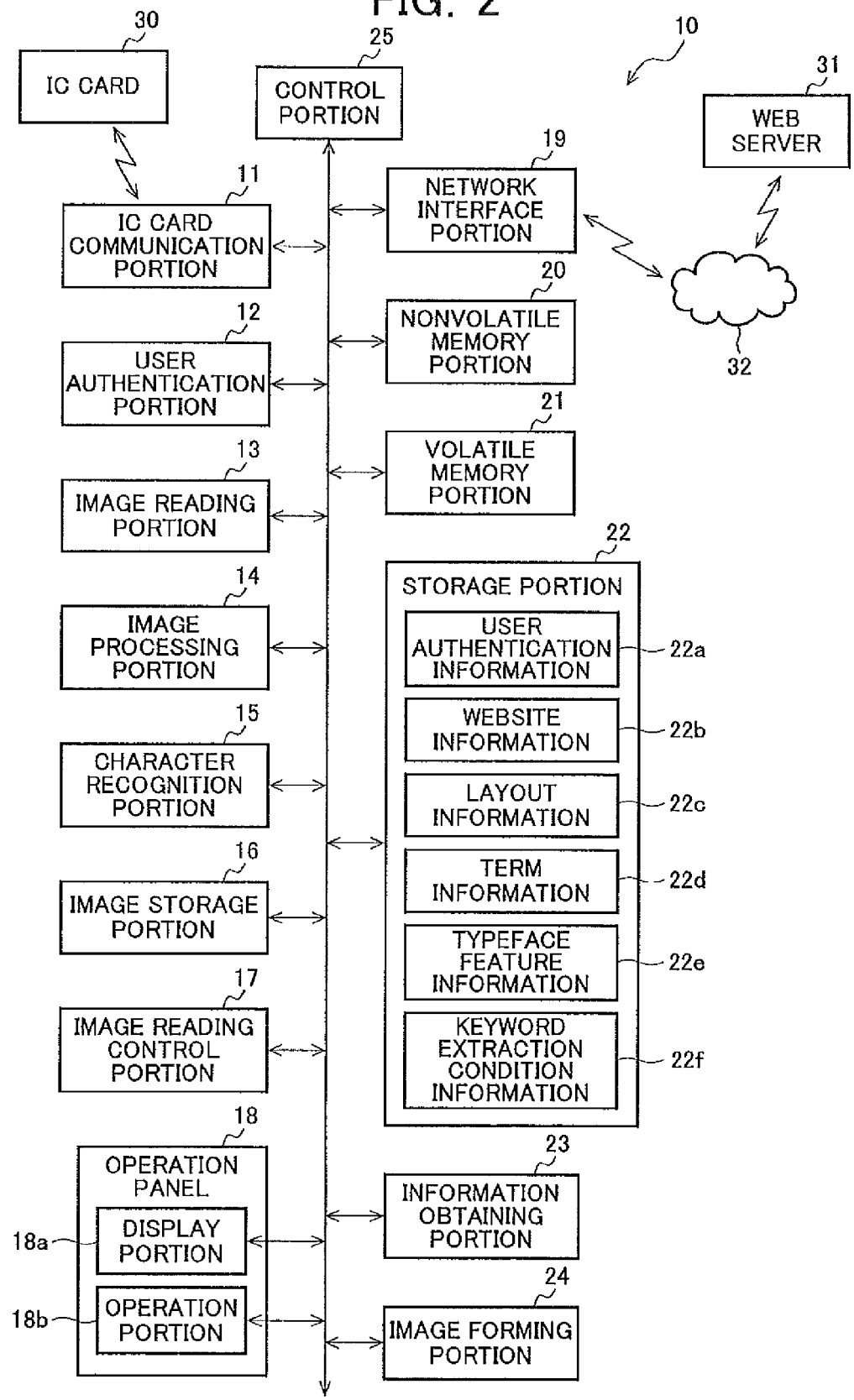
FIG. 2 is a block diagram showing an example of a configuration of the image forming apparatus according to the present invention.

Next, a configuration of an image forming apparatus 10 according to the present invention will be described. FIG. 2 is a block diagram showing an example of a configuration of the image forming apparatus 10 according to the present invention. As shown in FIG. 2, the image forming apparatus 10 is provided with an IC card communication portion 11, a user authentication portion 12, an image reading portion 13, an image processing portion 14, a character recognition portion 15, an image storage portion 16, an image reading control portion 17, an operation panel 18, a network interface portion 19, a nonvolatile memory portion 20, a volatile memory portion 21, a storage portion 22, an information obtaining portion 23, an image forming portion 24 and a control portion 25.

The IC card communication portion 11 is a processing portion to perform communication with the IC card 30. For example, when a user holds the IC card 30 in which user information is registered over the IC card communication portion 11, the IC card communication portion 11 detects the IC card 30 and performs communication with the IC card 30, and the IC card communication portion 11 outputs the user information received from the IC card 30 to the user authentication portion 12.

The user authentication portion 12 is a processing portion to perform user authentication. The user authentication portion 12 receives the user information from the IC card communication portion 11 and performs user authentication by comparing the received information with user authentication information 22a that is stored in the storage portion 22 which will be described below.

The image reading portion 13 is a device such as an image scanner for reading a document image. The image processing portion 14 is a processing portion to execute image processing such as rotation of an image for the document image read by the image reading portion 13. The character recognition portion 15 is a processing portion to perform character recognition for the document image read by the image reading portion 13 or for the document image to which the image processing is performed by the image processing portion 14.

Here, the character recognition portion 15 recognizes not only a character string of a term included in the document image, but also a character size, a character color and a typeface thereof. For example, the character recognition portion 15 recognizes the character size by detecting a width and a height of each character of the document image in which an image is read. Furthermore, the character recognition portion 15 recognizes the character color by detecting a color of each character. Furthermore, the character recognition portion 15 extracts a feature of a character structure of each character and compares the extracted feature and a feature of a character that is registered for each typeface as a typeface feature information 22e so as to recognize the typeface (see, for example, the art of Japanese Laid-Open Patent Publication No. 7-200734).

The image storage portion 16 is a storage device such as a hard disk device for storing information of a document image read by the image reading portion 13, a document image to which image processing is performed by the image processing portion 14, a character recognized by the character recognition portion 15 and the like. The image reading control portion 17 is a processing portion to control reading processing of the document image. For example, the image reading control portion 17 causes the image processing portion 14 to execute image processing by passing the document image read by the image reading portion 13 to the image processing portion 14, and causes the image storage portion 16 to store the information of the document image read by the image reading portion 13, the document image to which image processing is performed by the image processing portion 14, the character recognized by the character recognition portion 15 or the like.

The operation panel 18 is a device that displays various information and receives various input from a user. The operation panel 18 is provided with a display portion 18a and an operation portion 18b. The display portion 18a is a display device such as a liquid crystal display. The operation portion 18b is an input device such as a touch panel for receiving input of information from a user. The operation portion 18b is installed to overlap with the display portion 18a so as to detect pressing or the like of a button displayed on the display portion 18a. The network interface portion 19 is an interface portion to perform communication with a web server 31 or the like providing a website for performing dictionary search via a network 32.

The nonvolatile memory portion 20 is a storage device which is constituted by a nonvolatile memory such as a ROM (Read Only Memory). The nonvolatile memory 20 stores a computer program or the like for executing processing to be performed in the image forming apparatus 10. The volatile memory portion 21 is a storage device which is constituted by a volatile memory such as a RAM (Read Access Memory). The volatile memory portion 21 temporarily stores various data used in the image forming apparatus 10. The storage portion 22 is a storage device constituted by an auxiliary storage device such as a hard disk device. The storage portion 22 stores the user authentication information 22a, website information 22b, layout information 22c, term information 22d, typeface feature information 22e and keyword extraction condition information 22f.

The user authentication information 22a is authentication information to be used for performing user authentication. When user information is obtained from the IC card 30, the user authentication portion 12 detects whether or not the information is registered in the user authentication information 22a so as to perform user authentication.

The website information 22b is information of a website for performing dictionary search that is registered in association with identification information for identification of a user. This information includes a URL (Uniform Resource Locator) of the website, position information of a keyword input area for receiving input of a keyword for dictionary search on the website, position information of a search execution button for receiving an instruction of search execution on the website from a user, and information of a character string that is output from the website in the case of failure of the search.

When a user is authenticated by user authentication, the URL of the website that is registered in association with the identification information of the user is read out. Then, to the website, access is gained with use of the read URL to perform dictionary search. The information of the website is registered in advance by each user. Thereby, each user is able to set the website to be used for dictionary search freely according to user's preference, desired information, a use field, a use purpose, richness of information and the like.

The layout information 22c is setting information in which an area in which a document image is arranged and an area in which term information obtained as the result of dictionary search is arranged are set in an image with term information to be printed. By setting such information in advance, the user does not need to specify a layout in each case of generating an image with term information including a document image and term information, thereby increasing convenience. The term information 22d is information in which the term information obtained as the result of the dictionary search is stored. The term information includes information such as a meaning, a translation and an explanation of the searched term.

The typeface feature information 22e is information in which features such as a thickness of a vertical line, a horizontal line, or a transverse line of a character, and shapes of end points of each line is registered in association with each typeface such as a bold typeface or a fine type face. The keyword extraction condition information 22f is information of an extraction condition of a keyword set in advance and priority order information of each extraction condition of a keyword.

The information obtaining portion 23 is a processing portion to gain access, when character recognition is performed by the character recognition portion 15, to the website for performing dictionary search to cause the website to execute dictionary search with the term obtained as the result of the character recognition as the keyword so as to obtain term information obtained as the result thereof. At the time, the information obtaining portion 23 extracts a term that satisfies the extraction condition of the keyword from among the terms obtained as the result of the character recognition, and sets the extracted term as the keyword. For example, the information obtaining portion 23 extracts a term in an area specified by a user, a term of a character string which corresponds to a character string input by the user, a term that satisfies a condition of a character size specified by the user, a term that satisfies a condition of a character color specified by the user, or a term that satisfies a condition of a typeface specified by the user so as to set the extracted term as the keyword.

Here, the information obtaining portion 23 selects a website for performing dictionary search from among the websites registered in the website information 2 the user authentication. The information obtaining portion 23 then stores information obtained as the result of the dictionary search on the website as the term information 22d in the storage portion 22.

The image forming portion 24 is a processing portion to print an image. Specifically, the image forming portion 24 generates image with term information including a document image read by the image reading portion 13 and term information obtained by the information obtaining portion 23 from the web server 31, and prints the generated image with term information. The image forming portion 24 may generate an image with term information to be fit in one page of a sheet in a predetermined size at the time of printing, or generate an image with term information to be printed over a plurality of pages. In addition, in the case where unnecessary information such as advertisements is included in the term information obtained from the web server 31, the image forming portion 24 performs processing to remove the unnecessary information so as to generate image with term information including the term information from which the unnecessary information is removed and the document image, and prints the generated image with the term information. By generating the image with term information by which the document image and the term information are able to be printed at once, the user is able to use a printed matter of the image with term information as an instruction manual.

The control portion 25 is a processing portion to control the whole of the image forming apparatus 10. The control portion 25 is constituted by a CPU (Central Processing Unit) and the like. The control portion 25 controls transmission/receipt, etc., of data between respective function portions shown in FIG. 2.

Figure 3:
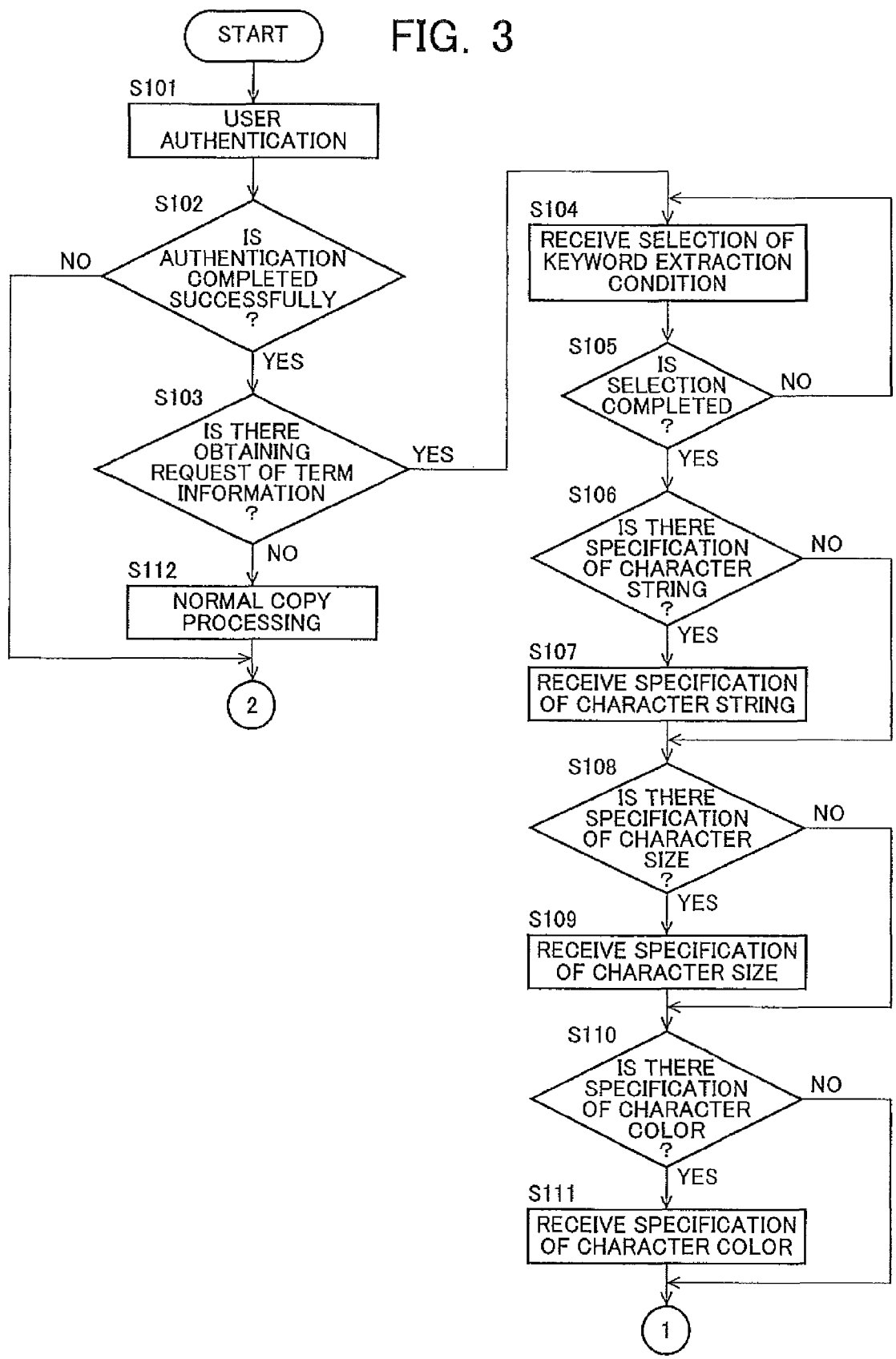
FIG. 3 is a flowchart showing an example of processing procedure of the image forming processing according to the present invention.

Next, processing procedure of the image forming processing according to the present invention will be described. FIG. 3 to FIG. 6 are flowcharts showing an example of processing procedure of the image forming processing according to the present invention. As shown in FIG. 3, first, when a user holds the IC card 30 over the IC card communication portion 11, which is detected by the user authentication portion of the image forming apparatus 10 to perform user authentication (step S101). Specifically, the user authentication portion 12 obtains the user authentication information registered in the IC card 30 from the IC card communication portion 11 and determines whether or not the obtained user authentication information is registered in the user authentication information 22a that is stored in the storage portion 22.

Then, the user authentication portion 12 determines whether or not the user authentication is completed successfully (step S102). Specifically, the user authentication portion 12 determines the user authentication is completed successfully when the user authentication information is registered in the user authentication information 22a. When the user authentication information is not registered in the user authentication information 22a, the user authentication portion 12 determines the user authentication failed.

When the user authentication failed (in the case of NO at step S102), the image forming processing is then finished. When the user authentication is completed successfully (in the case of YES at step S102), the information obtaining portion 23 determines whether or not an obtaining request of term information is received from a user (step S103). Specifically, the information obtaining portion 23 displays on the display portion 18a a screen to receive input of whether or not to obtain the term information from a user, and determines whether or not the input is received from the user through the operation portion 18b.

When the obtaining request of the term information is not received from the user (in the case of NO at step S103), the image forming portion 24 executes normal copy processing to print a document image read by the image reading portion 13 (step S112). Thereafter, the image forming processing is finished. When the obtaining request of the term information is received from the user (in the case of YES at step S103), the information obtaining portion 23 receives from a user a selection of a keyword extraction condition used in extracting a keyword for dictionary search from the document image read by the image reading portion 13 (step S104).

Figure 7:
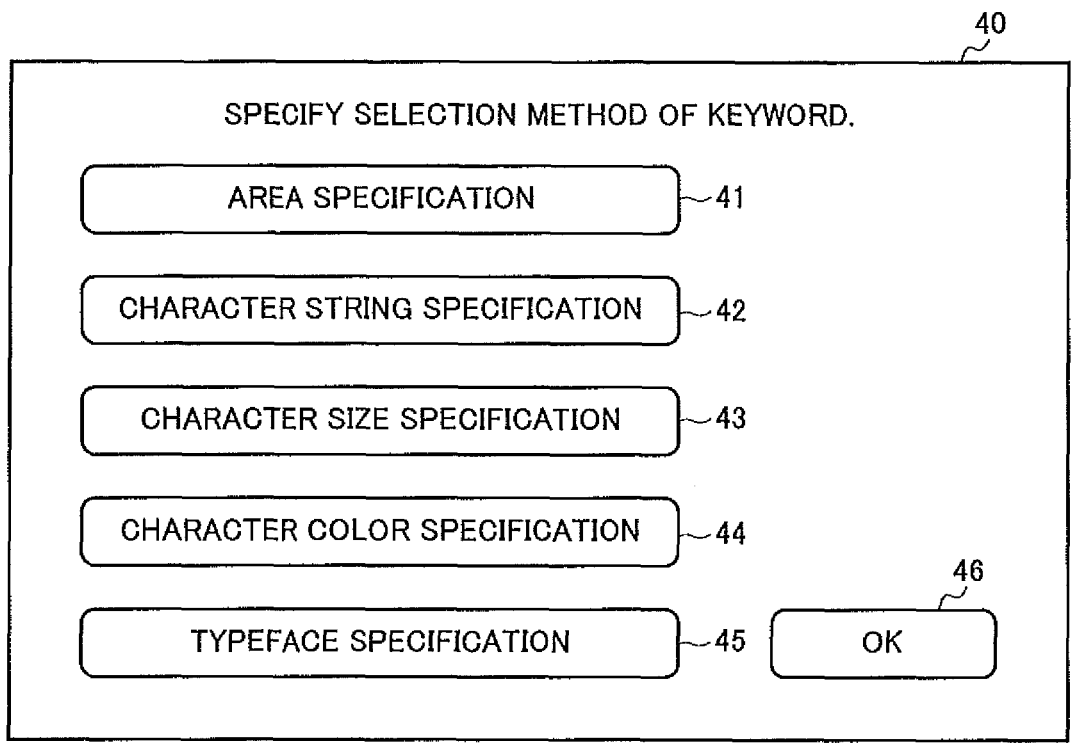
FIG. 7 is a diagram showing an example of a selection screen that receives a selection of an extraction condition of a keyword.

FIG. 7 is a diagram showing an example of a selection screen 40 that receives a selection of an extraction condition of a keyword. On the selection screen 40, an area specification button 41, a character string specification button 42, a character size specification button 43, a character color specification button 44, a typeface specification button 45, and an OK button 46 are displayed.

The area specification button 41 is a button for a user to specify a term included in a document image by enclosing the term in a rectangular area and sets the specified term as a keyword for dictionary search. When the area specification button 41 is pressed and the OK button 46 is further pressed, the operation portion 18b receives from a user specification of a vertex of the rectangular area enclosing the term included in the document image. The information obtaining portion 23 obtains information of the vertex, and selects the term included in the rectangular area and specified by the obtained vertex information as a keyword for performing dictionary search when character recognition of the document image is performed. The user is able to directly specify the keyword in this manner.

The character string specification button 42 is a button for a user to input a character string to set a keyword for performing dictionary search. When the character string specification button 42 is pressed, and the OK button 46 is further pressed, the display portion 18a displays a virtual keyboard and the operation portion 18b receives input of a character string which is made with use of the virtual keyboard from a user. The information obtaining portion 23 obtains information of the character string, and selects a term of a character string corresponding to the obtained character string as a keyword for performing dictionary search when character recognition of the document image is performed. The user is able to directly specify the keyword in this manner.

The character size specification button 43 is a button for setting a term that satisfies a character size condition set in advance from among the terms included in the document image as a keyword for performing dictionary search. When the character size specification button 43 is pressed and the OK button 46 is further pressed, the operation portion 18b receives specification of the character size condition (for example, 18 points or more, etc.) from a user. The information obtaining portion 23 obtains information of the character size condition, and selects a term that satisfies the character size condition as a keyword for performing dictionary search when character recognition of the document image is performed. Thereby, it is possible to effectively select as a keyword an important term emphasized and described in large size characters in a headline or the like.

The character color specification button 44 is a button for setting a term in a same character color as the character color set in advance from among the terms included in a document image as a keyword for performing dictionary search. When the character color specification button 44 is pressed and the OK button 46 is further pressed, the operation portion 18b receives specification of the character color condition (for example, red, etc.) from a user. The information obtaining portion 23 obtains information of the character color condition, and selects a term in the character color that satisfies the character color condition as a keyword for performing dictionary search when character recognition of the document image is performed. Thereby, it is possible to effectively select as a keyword an important term emphasized and described in a specific character color.

The typeface specification button 45 is a button for setting a term in a same typeface as the typeface of the character that is set in advance from among the terms included in a document image as a keyword for performing dictionary search. When the typeface specification button 45 is pressed and the OK button 46 is further pressed, the operation portion 18b receives specification of the typeface condition (for example, bold typeface, etc.) from a user. The information obtaining portion 23 obtains information of the typeface condition, and selects a term in the typeface that satisfies the typeface condition as a keyword for performing dictionary search when character recognition of the document image is performed. Thereby, it is possible to effectively select as a keyword an important term emphasized and described in a special typeface.

The OK button 46 is a button for setting a keyword extraction condition. Specifically, the information obtaining portion 23 sets, when the area specification button 41, the character string specification button 42, the character size specification button 43, the character color specification button 44 or the typeface specification button 45 is pressed, and the OK button 46 is further pressed by a user, each condition of the area specification, the character string specification, the character size specification, the character color specification or the typeface specification as the keyword extraction condition.

Further, in the order of pressing the area specification button 41, the character string specification button 42, the character size specification button 43, the character color specification button 44 or the typeface specification button 45, the user is able to set the priority of the keyword extraction conditions. In this case, the information obtaining portion 23 stores information of the order of pressing of each button in the storage portion 22 as the keyword extraction condition information 22f. This priority information is used for a case where there are larger number of keywords compared to the number of the areas in which the term information is displayed so that the keywords are needed to be sorted out. In this manner, extraction of the terms is performed by using various extraction conditions so that appropriate keywords are able to be set for documents described in various formats.

Returning to the explanation of FIG. 3, after step S104, the information obtaining portion 23 checks whether or not a selection of a condition for extraction of a keyword is completed (step S105). Specifically, the information obtaining portion 23 determines whether or not the OK button 46 is pressed by the user. When the selection of the keyword extraction condition is not completed (in the case of NO at step S105), the process shifts to step S104 and the information obtaining portion 23 continues to receive a selection of the condition for extraction of a keyword from a user.

When the selection of the keyword extraction condition is completed (in the case of YES at step S105), the information obtaining portion 23 checks whether or not there is a condition of character string specification in the selected keyword extraction conditions (step S106). When there is the condition of the character string specification (in the case of YES at step S106), the information obtaining portion 23 receives specification of the character string from a user (step S107). Specifically, the information obtaining portion 23 displays a virtual keyboard on the display portion 18*a* and the operation portion 18*b* detects a key of the virtual keyboard pressed by the user. The information obtaining portion 23 then receives specification of the character string from the user by obtaining from the operation portion 18*b* the information of the detected pressed key.

When there is no condition of the character string specification at step S106 (in the case of NO at step S106), or when the specification of the character string is received from a user at step S107, the information obtaining portion 23 checks whether or not there is a condition of character size specification in the selected keyword extraction conditions (step S108). When there is the condition of the character size specification (in the case of YES at step S108), the information obtaining portion 23 receives specification of the character size from the user through the operation portion 18*b* (step S109). Specifically, the information obtaining portion 23 displays a screen to receive specification of the character size on the display portion 18*a* and receives specification of the character size from the user by obtaining from the operation portion 18*b* the information of the character size which is specified by the user through the operation portion 18*b* on the screen.

When there is no condition of the character size specification at step S108 (in the case of NO at step S108), or when the specification of the character size is received from a user at step S109, the information obtaining portion 23 checks whether or not there is a condition of character color specification in the selected keyword extraction conditions (step S110). When there is the condition of the character color specification (in the case of YES at step S110), the information obtaining portion 23 receives specification of the character color from the user through the operation portion 18*b* (step S111). Specifically, the information obtaining portion 23 causes the display portion 18*a* to display a screen to receive the specification of the character color and receives the specification of the character color from a user by obtaining from the operation portion 18*b* the information of the character color which is specified by the user through the operation portion 18*b* on the screen.

Figure 4:
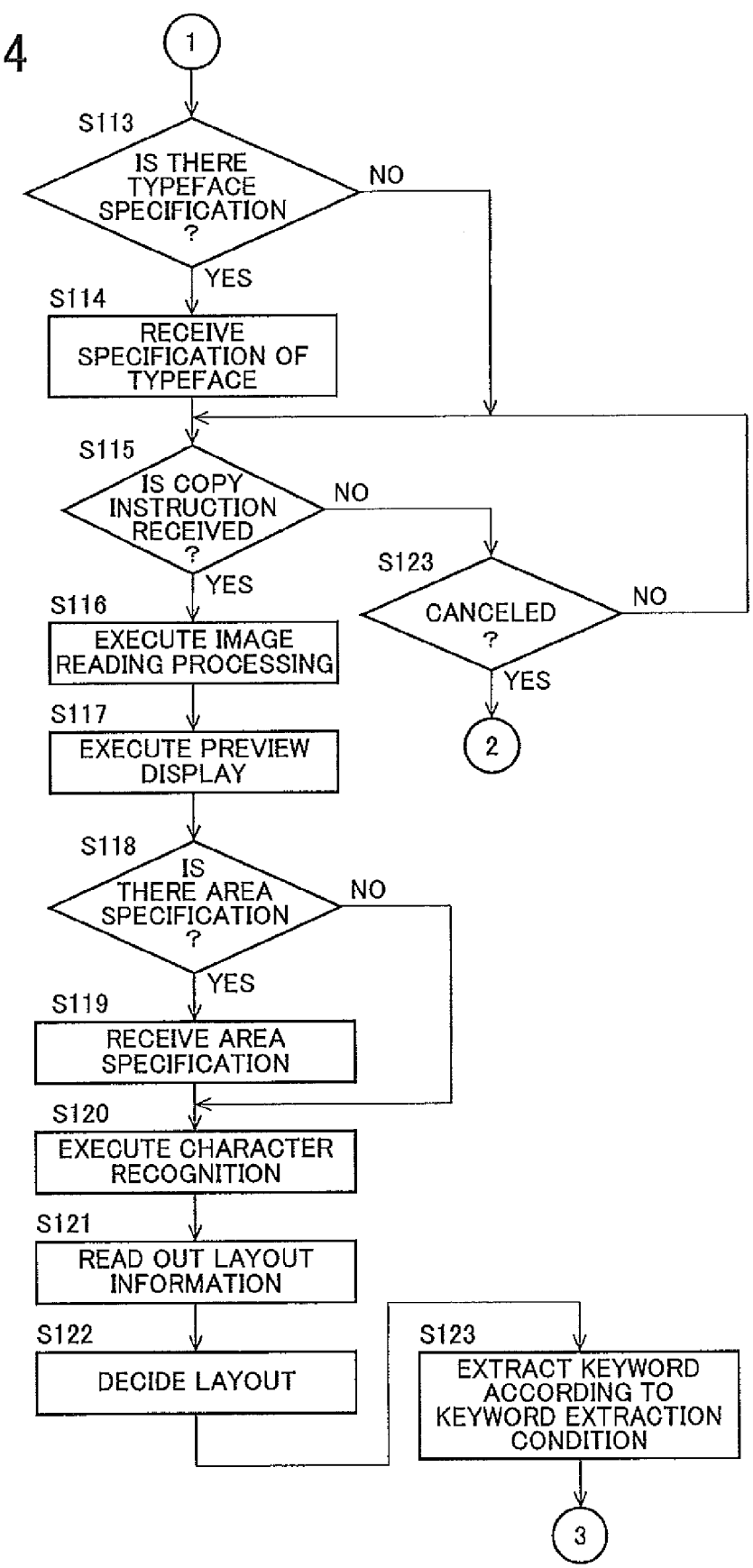
FIG. 4 is a flowchart showing an example of processing procedure of the image forming processing according to the present invention.

When there is no condition of the character color specification at step S110 (in the case of NO at step S110), or when the specification of the character color is received from a user at step S111, as shown in FIG. 4, the information obtaining portion 23 checks whether or not there is a condition of typeface specification in the selected keyword extraction conditions (step S113). When there is the condition of the typeface specification (in the case of YES at step S113), the information obtaining portion 23 receives specification of the typeface of a character from the user through the operation portion 18*b* (step S114). Specifically, the information obtaining portion 23 causes the display portion 18*a* to display a screen to receive the specification of the typeface of a character and receives the specification of the typeface from the user by obtaining from the operation portion 18*b* the information of the typeface of a character which is specified by the user through the operation portion 18*b* on the screen.

When there is no condition of the typeface specification at step S113 (in the case of NO at step S113), or when the specification of the typeface of a character is received from a user at step S114, the image forming portion 24 determines whether or not an execution instruction of copy processing is received through the operation portion 18*b* from the user (step S115). When the execution instruction of copy processing is not received from the user (in the case of NO at step S115), the image forming portion 24 determines whether or not an instruction to cancel the execution of copy processing is received from the user (step S123). When the instruction to cancel the execution of copy processing is received from the user (in the case of YES at step S123), the image forming processing is then finished. When the instruction to cancel the execution of copy processing is not received from the user (in the case of NO at step S123), the process shifts to step S115 and the image forming portion 24 continues subsequent processing.

When the image forming portion 24 receives the execution instruction of copy processing from the user at step S115 (in the case of YES at step S115), the image reading portion 13 scans a document to read a document image and executes image reading processing for storing the read image in the image storage portion 16 (step S116). The image forming portion 24 then executes preview display processing to display the read document image on the display portion 18*a* (step S117).

Figure 8:
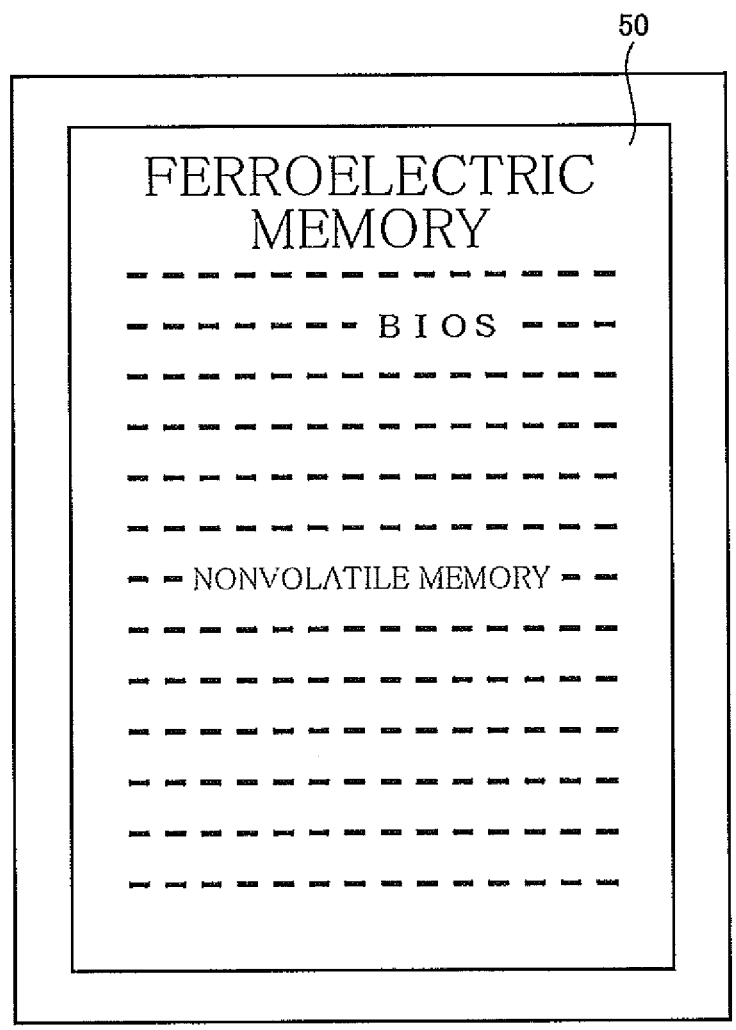
FIG. 8 is a diagram showing an example of a document image.

FIG. 8 is a diagram showing an example of a document image 50. For example, in the document image 50 shown in FIG. 8, a character size of a term "ferroelectric memory" is 18 points, and a typeface of characters of a term "BIOS" is a bold typeface, and a character color of a term "nonvolatile memory" is red. Then, it is assumed that a character size of the other characters is less than 18 points, and a typeface thereof is a fine typeface, and a color thereof is black.

In this case, when the condition of 18 points or more is set as the keyword extraction condition of the character size, the term "ferroelectric memory" is selected as a candidate for a keyword for dictionary search. Further, when the condition of a bold typeface is set as the keyword extraction condition of the typeface of characters, the term "BIOS" is selected as a candidate for a keyword for dictionary search. Further, when the condition of red is set as the keyword extraction condition of the character color, the term "nonvolatile memory" is selected as a candidate for a keyword for dictionary search.

Returning to the explanation of FIG. 4, after step S117, the information obtaining portion 23 checks whether or not there is a condition of character area specification in the selected keyword extraction conditions (step S118). When there is the condition of the character area specification (in the case of YES at step S118), the information obtaining portion 23 receives specification of the character area from a user through the operation portion 18*b* (step S119). Specifically, the operation portion 18b receives specification of a rectangular area enclosing characters included in a document image that is displayed on the display portion 18a. The information obtaining portion 23 then receives the specification of the character area by obtaining from the operation portion 18b the information of the specified rectangular area.

When there is no condition of the character area specification at step S118 (in the case of NO at step S118), or when the specification of the character size is received from a user at step S119, the character recognition portion 15 executes character recognition processing to recognize the term included in the document image read at step S116 (step S120).

The image forming portion 24 then reads out the layout information 22c from the storage portion 22 (step S121) and decides a layout of the image with term information to be printed finally (step S122). Specifically, the image forming portion 24 causes the display portion 18a to display a screen allowing a user to select a layout of the image with term information, and decides the layout by receiving a selection of the layout from the user by the operation portion 18b.

Figure 9:
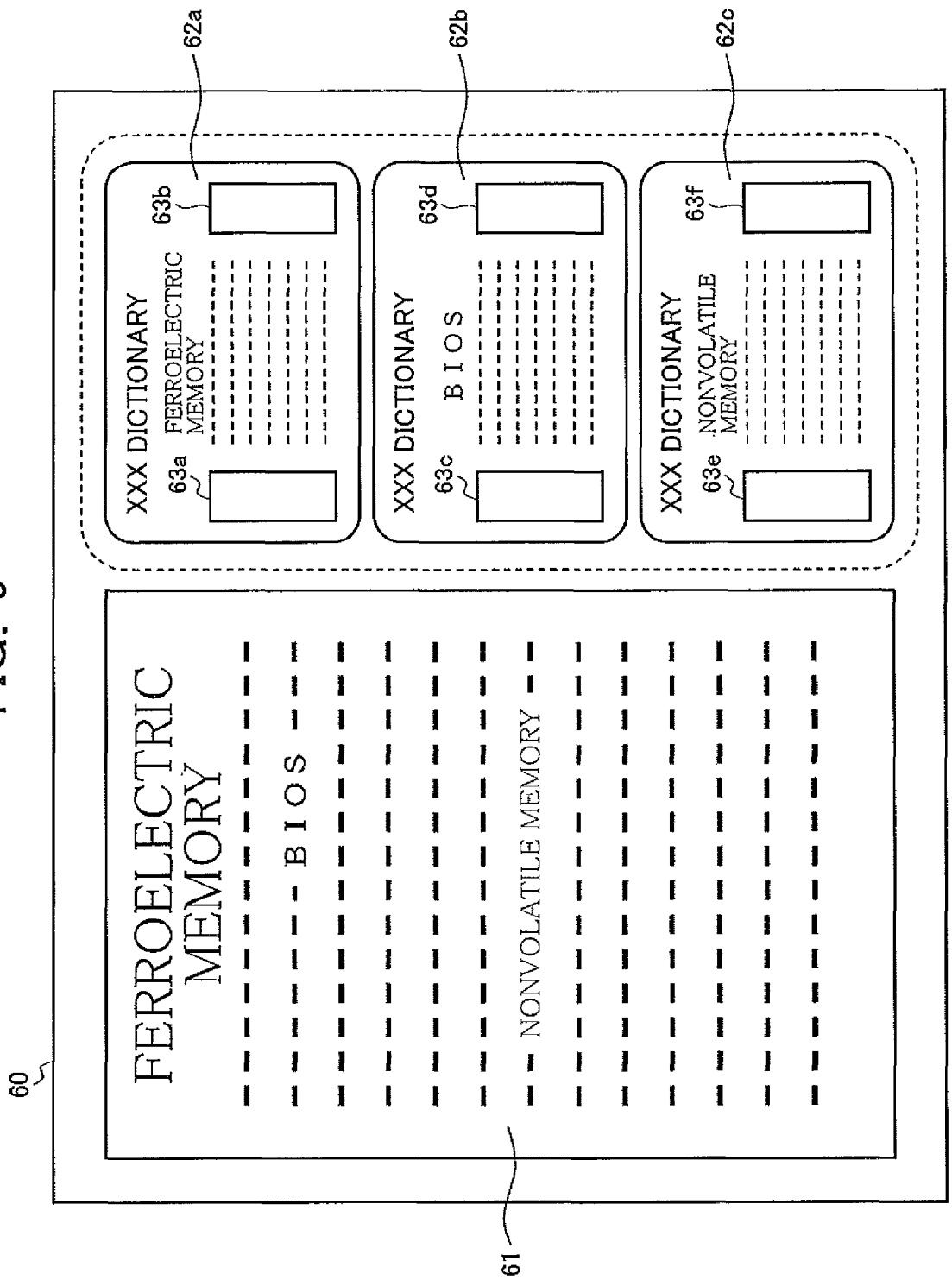
FIG. 9 is a diagram showing an example of a layout of an image with term information.

FIG. 9 is a diagram showing an example of a layout 60 of an image with term information. In the layout 60 shown in FIG. 9, a document image display area 61 and three term information display areas 62a to 62c are included. The document image display area 61 is an area in which the document image 50 read at step S116 of FIG. 4 is displayed. The term information display areas 62a to 62c are areas in which term information obtained by searching terms set as keywords on a website for performing dictionary search is displayed. The term information includes information such as meaning, a translation and an explanation and the like of the searched term. Additionally, when advertisements 63a to 63f are included in the term information, the advertisements 63a to 63f are also displayed in the term information display areas 62a to 62c.

Figure 10A:
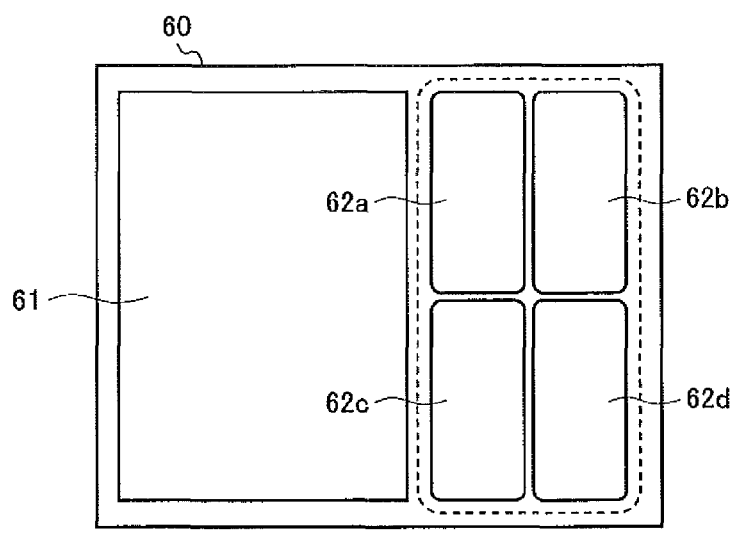
FIG. 10A to FIG. 10C are diagrams showing other examples of the layout of the image with term information.
Figure 10B:
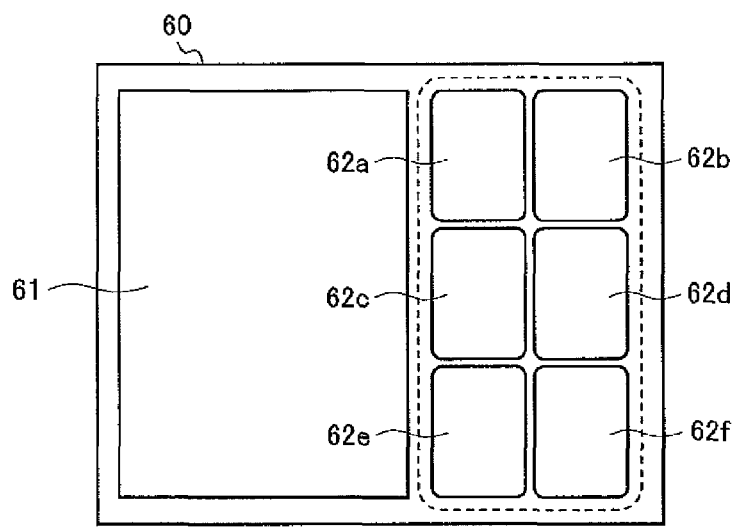
Figure 10C:
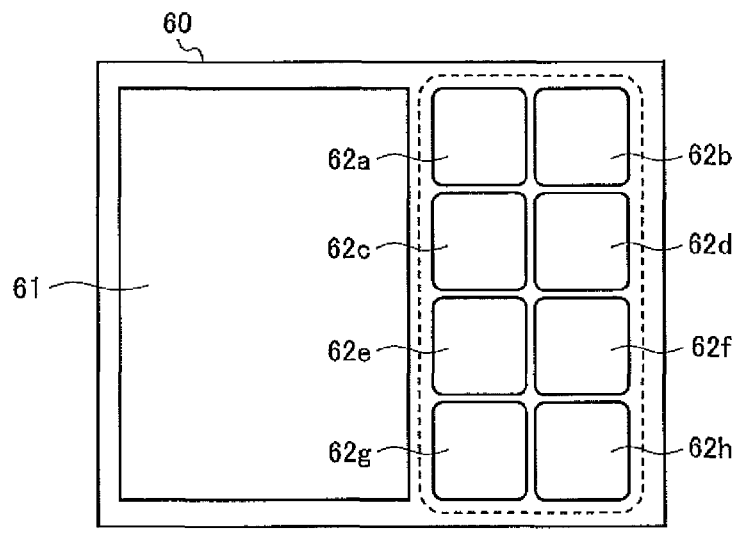

FIG. 10A to FIG. 10C are diagrams showing other examples of the layout 60 of the image with term information. In FIG. 10A to FIG. 10C, three examples of the layout 60 are shown (FIG. 10A to FIG. 10C). In each layout 60 of FIG. 10A to FIG. 10C, as with the layout 60 shown in FIG. 9, the document image display area 61 and the term information display areas 62a to 62h are included, however, each layout 60 has the number of the term information display areas 62a to 62h different from each other. That is, in the layout 60 of FIG. 10A, the number of the term information display areas 62a to 62d is four, in the layout 60 of FIG. 10B, the number of the term information display areas 62a to 62f is six, and in the layout 60 of FIG. 10C, the number of the term information display areas 62a to 62h is eight. The image forming portion 24 receives a selection of any one layout 60 from among the layouts 60 as described above, and thereby decides the layout 60 of the image with term information to be printed.

Further, a user is able to reduce or enlarge the document image display area 61 or the term information display areas 62a to 62h. In this case, the image forming portion 24 displays a screen to receive specification of a reduction ratio or an enlargement ratio from the user on the display portion 18a, and the operation portion 18b receives the specification of the reduction ratio or the enlargement ratio from the user. Based on the reduction ratio or the enlargement ratio received from the user by the operation portion 18b, the image forming portion 24 reduces/enlarges the document image display area 61 or the term information display areas 62a to 62h and decides the layout of the image with term information to be printed.

Furthermore, along with reduction/enlargement of the document image display area 61 or the term information display areas 62a to 62h, the image forming portion 24 reduces/enlarges a document image displayed in the document image display area 61 or term information displayed in the term information display areas 62a to 62h. In this manner, it is possible to print the image with term information in consideration of viewability by enabling reduction/enlargement of the document image display area 61 or the term information display areas 62a to 62h.

Returning to the explanation of FIG. 4, after the processing at step S122, the information obtaining portion 23 extracts a keyword from among the terms recognized in the character recognition at step S120 according to the keyword extraction condition selected at step S104 of FIG. 3 (step S123). Specifically, the information obtaining portion 23 extracts the following terms as a candidate for a keyword for dictionary search, when the character string is specified at step 107 of FIG. 3, the term of the same string as the specified character string; when the condition of the character size is specified at step 109, the term that satisfies the condition of the specified character size; when the condition of the character color is specified at step 111, the term that satisfies the condition of the specified character color; when the condition of the typeface of a character is specified at step 114, the term that satisfies the condition of the specified typeface; and when the character area is specified at step 119, the term included in the specified character area.

Figure 5:
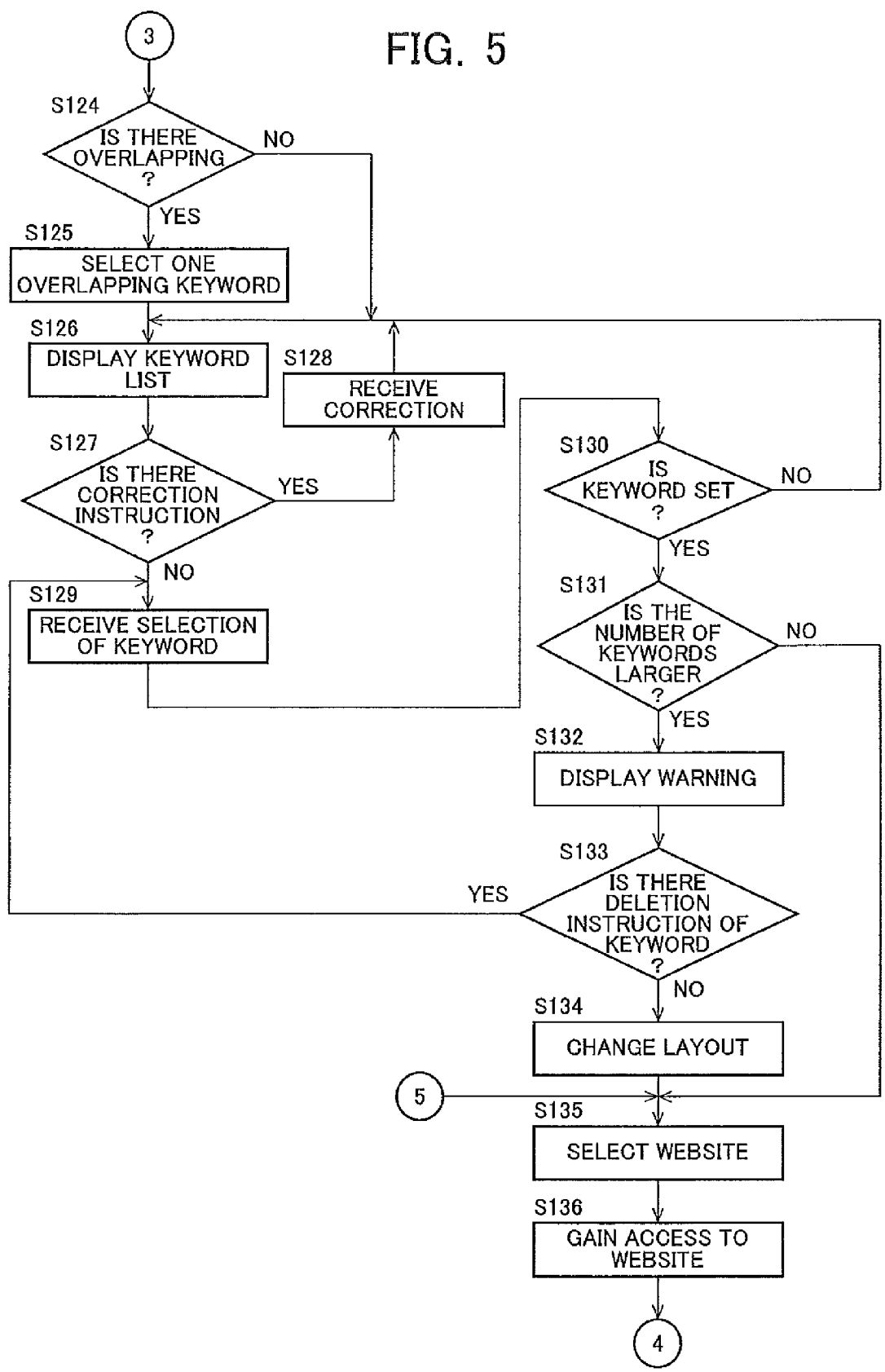
FIG. 5 is a flowchart showing an example of processing procedure of the image forming processing according to the present invention.

Then, as shown in FIG. 5, the information obtaining portion 23 determines whether or not there are overlapping keywords in the extracted keywords (step S124). When there are overlapping keywords (in the case of YES at step S124), the information obtaining portion 23 selects a high priority keyword that is registered in the keyword extraction condition information 22f from among the overlapping keywords (step S125).

After the processing at step S125, or when there is no overlapping keyword (in the case of NO at step S124), the information obtaining portion 23 causes the display portion 18a to display a list of the keywords extracted at step S123 of FIG. 4 (step S126). Note that, when there are the overlapping keywords in the processing at step S124, the information obtaining portion 23 displays only one keyword selected at step S125 from among the overlapping keywords on the display portion 18a.

Figure 11:
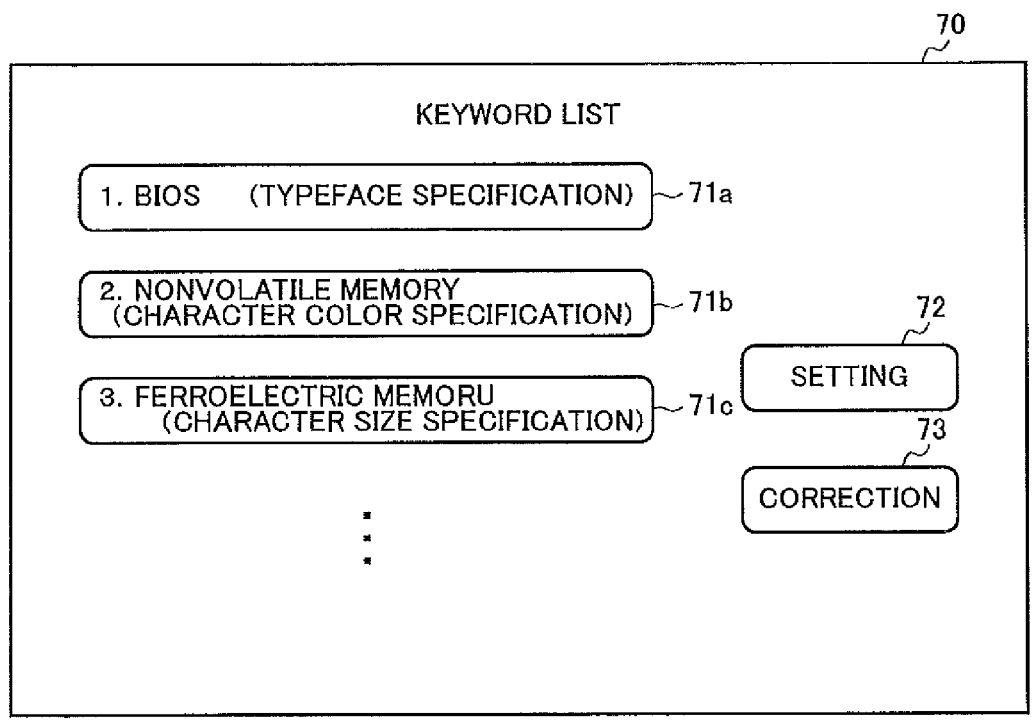
FIG. 11 is a diagram showing an example of a keyword display screen displaying a list of keywords.

FIG. 11 is a diagram showing an example of a keyword display screen 70 displaying a list of keywords. As shown in FIG. 11, on the keyword display screen 70, keyword display buttons 71a to 71c, a setting button 72, and a correction button 73 are displayed. The keyword display buttons 71a to 71c are buttons showing each keyword extracted from a document image. In the keyword display buttons 71a to 71c, extracted keywords and keyword extraction conditions used for extracting the keywords are displayed.

Furthermore, each of the keyword display buttons 71a to 71c is displayed in order of priority of the keyword extraction conditions registered in the keyword extraction condition information 22f. For example, when the priority order of the keyword extraction conditions is the typeface specification, the character color specification, the character size specification in this order, the keyword display button 71a showing the term "BIOS" extracted on the typeface specification condition, the keyword display button 71b showing the term "nonvolatile memory" extracted on the character color specification condition and the keyword display button 71c showing the term "ferroelectric memory" extracted on the character size specification condition are displayed in this order.

The setting button 72 is a button for setting a keyword for dictionary search on the website for dictionary search. When the keyword display screen 70 is displayed at first, keywords displayed on the keyword display buttons 71a to 71c are all in the state of being selected. When a user presses the setting button 72 without any change, the information obtaining portion 23 sets all the keywords as the keywords for dictionary search.

Moreover, in the state where the keyword display buttons 71a to 71c are selected and when a user presses the keyword display buttons 71a to 71c in the state of being selected, the information obtaining portion 23 changes the display color of the pressed keyword display buttons 71a to 71c and releases the selection of the keywords. When the user presses the setting button 72 in this state, the information obtaining portion 23 sets only the selected keyword as the keyword for dictionary search. In this manner, by enabling sorting out of a keyword for dictionary search, dictionary search of an unnecessary keyword is able to be omitted, and thereby making it possible to prevent from including term information for an unnecessary keyword in an image with term information.

The correction button 73 is a button used for correcting a keyword. When a user presses any of keyword display buttons 71a to 71c displaying a keyword to which the user wishes to make a correction, and further presses the correction button 73, the information obtaining portion 23 causes the display portion 18a to display a virtual keyboard, and the operation portion 18b receives input of a keyword from a user by means of the virtual keyboard. The information obtaining portion 23 then replaces the keyword corresponding to any of the pressed keyword display buttons 71a to 71c with the input keyword to correct the keyword. For example, in the example of FIG. 11, "ferroelectric memory" is mistakenly recognized as "ferroelectricmemoru" in character recognition. In such a case, as described above, the information obtaining portion 23 replaces the "ferroelectric memoru" with "ferroelectric memory". By displaying such keyword display screen 70, a user is able to easily confirm whether or not a keyword is extracted appropriately, and to easily correct the keyword that is not appropriately extracted.

Returning to the explanation of FIG. 5, after step S126, the information obtaining portion 23 determines whether or not a correction instruction of the keyword is given from a user (step S127). Specifically, the information obtaining portion 23 determines that the correction instruction of the keyword is given, when the correction button 73 is pressed by the user on the keyword display screen 70 shown in FIG. 11 and such information is received from the operation portion 18b. On the other hand, when the setting button 72 is pressed by the user and such information is received from the operation portion 18b, the information obtaining portion 23 determines that the correction instruction of the keyword is not given.

When the correction instruction of the keyword is given (in the case of YES at step S127), the information obtaining portion 23 receives a correction of a keyword from the user through the operation portion 18b (step S128). Thereafter, the process shifts to step S126 and the information obtaining portion 23 displays the list of keywords again on the display portion 18a.

At step S127, when the correction instruction of the keyword is not given (in the case of NO at step S127), the information obtaining portion 23 receives a selection of a keyword (step S129). Specifically, the information obtaining portion 23 receives a selection of the keyword that is performed by pressing the keyword display buttons 71a to 71c on the keyword display screen 70 shown in FIG. 11 by the user.

The information obtaining portion 23 then determines whether or not the selected keyword is set (step S130). Specifically, the information obtaining portion 23 determines whether or not the selected keyword is set by determining whether or not the setting button 72 is pressed on the keyword display screen 70 shown in FIG. 11.

When the selected keyword is not set (in the case of NO at step S130), the process shifts to step S126 and the information obtaining portion 23 executes subsequent processing. When the selected keyword is set (in the case of YES at step S130), the information obtaining portion 23 determines whether or not the number of keywords set at step S129 is larger than the number of the term information display areas 63a to 63h in the layout 60 that is decided at step S122 of FIG. 4 (step S131).

When the number of keywords is larger than the number of the term information display areas 63a to 63h (in the case of YES at step S131), the information obtaining portion 23 causes the display portion 18a to display a warning screen for receiving a deletion request of a keyword from a user (step S132). The information obtaining portion 23 then determines whether or not the deletion request of the keyword is received from a user (step S133). When the deletion request of the keyword is received from the user (in the case of YES at step S133), the process shifts to step S129, and the information obtaining portion 23 receives a selection of a keyword from a user again.

At the time, when the user presses the setting button 72 on the keyword display screen 70 shown in FIG. 11 without any change, the information obtaining portion 23 sequentially selects a keyword corresponding to the high priority keyword extraction condition only by the number of the term information display areas 63a to 63h. Furthermore, when the user presses the keyword display buttons 71a to 71c to release the selection of the keywords corresponding to the pressed keyword displayed buttons 71a to 71c and thereafter presses the setting button 72, the information obtaining portion 23 sets the keyword in the state of being selected at this time as a keyword for dictionary search. The number of the term information display areas 63a to 63h are thereby able to be identical with the number of the keywords so that the user is able to obtain an image with term information generated without any disruption of the easily viewable layout 60 set in advance.

When the deletion request is not received from the user at step S133 (in the case of NO at step S133), the image forming portion 24 changes the layout 60 decided at step S122 of FIG. 4 to another layout 60 having the same number of the term information display areas 62a to 62c as the number of keywords (step S134).

For example, in the case of the layout 60 shown in FIG. 9, the image forming portion 24 reduces the document image display area 61 or reduces the term information display areas 62a to 62c, or reduces both the document image display area 61 and the term information display areas 62a to 62c so as to secure an area in which the same number of the term information display areas 62a to 62c as the number of keywords are able to be arranged. The image forming portion 24 then changes the original layout 60 shown in FIG. 9 to a layout 60 in which the document image display area 61 and the same number of the term information display areas as the number of keywords are arranged. Note that, the image forming portion 24 reduces and displays, when displaying a document image in the document image display area 61 which is reduced, according to the reduction thereof, the document image, and reduces and displays, when displaying term information in the term information display areas 62a to 62c which are reduced and displayed, according to the reduction thereof, the term information. The user is thereby able to easily obtain an image with term information including all the searched term information.

Returning to the explanation of FIG. 5, after step S134, the information obtaining portion 23 selects a website for performing dictionary search (step S135). Specifically, the information obtaining portion 23 reads out the information of the URL of the website registered in association with the identification information of the user authenticated at step S101 of FIG. 3 from the website information 22b stored in the storage portion 22. The information obtaining portion 23 then selects the website from which the URL information is read out as the website for performing dictionary search. Then, the information obtaining portion 23 gains access to the website for performing dictionary search using the read URL (step S136).

Figure 6:
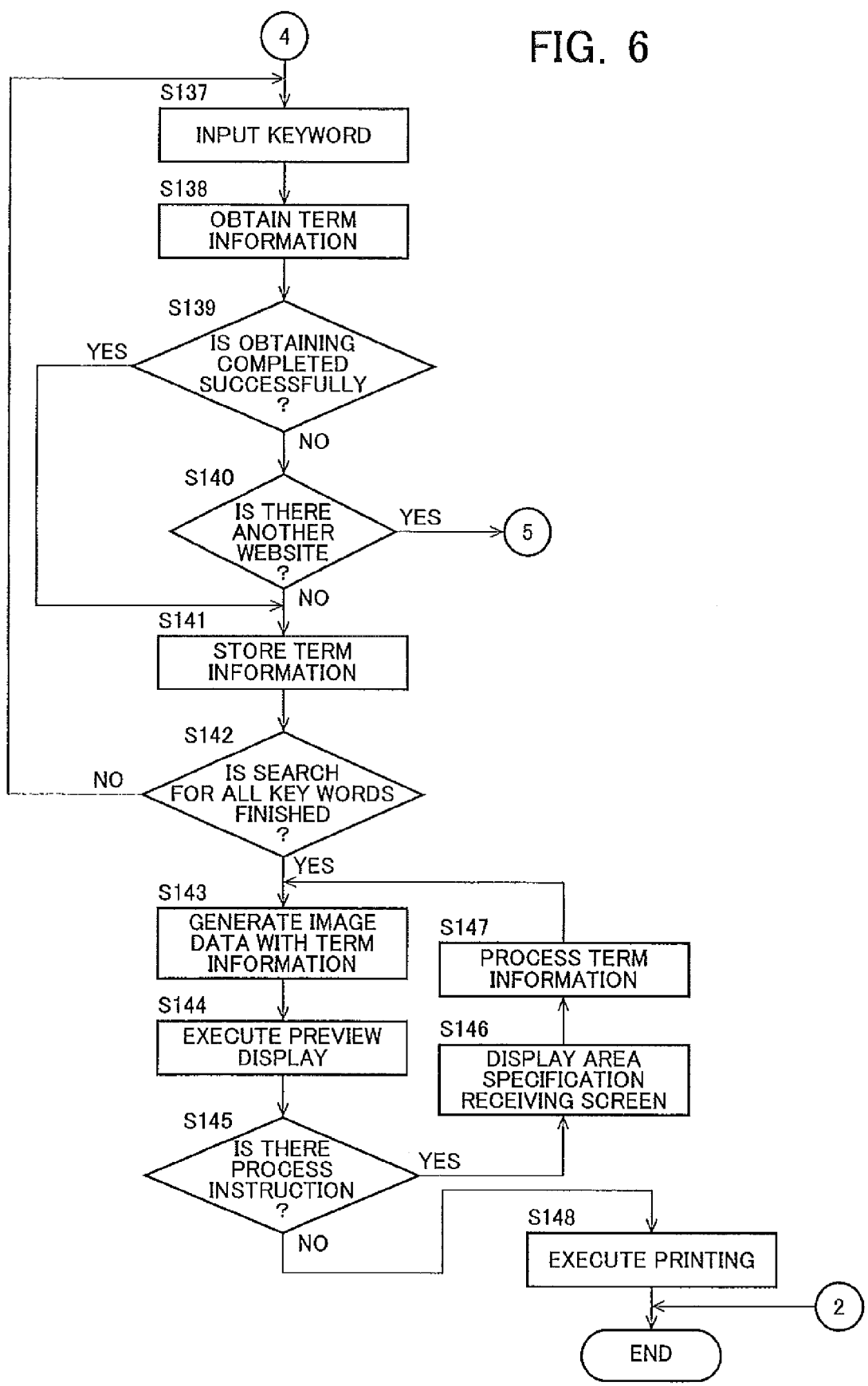
FIG. 6 is a flowchart showing an example of processing procedure of the image forming processing according to the present invention.

As shown in FIG. 6, thereafter, the information obtaining portion 23 inputs a keyword in a keyword input area for dictionary search on the website (step S137). Specifically, the information obtaining portion 23 reads out information of a position of the keyword input area on the website from the website information 22b, and inputs the keyword set at step S130 of FIG. 5 in the position (step S137).

The information obtaining portion 23 then executes a search on the website to obtain term information corresponding to the input keyword (step S138). Specifically, the information obtaining portion 23 reads out information of a position of a search execution button for instructing execution of a search on the website from the website information 22b, and the search is executed by pressing the search execution button at the position.

The information obtaining portion 23 then determines whether or not obtaining of term information is completed successfully (step S139). Specifically, the information obtaining portion 23 reads out information of a character string output from the website in the case of failure of the search. The information obtaining portion 23 then detects whether or not the character string is output from the website as the result of dictionary search, thereby performing the above-described determination.

When obtaining of the term information failed (in the case of NO at step S139), the information obtaining portion 23 determines whether or not another website different from the website which failed to obtain the term information is registered in the website information 22b in association with the identification information of the user authenticated at step S101 of FIG. 3 (step S140). When another website is registered in the website information 22b (in the case of YES at step S140), the process shifts to step S135 and the information obtaining portion 23 selects the another website to continue subsequent processing.

Note that, it is described here that it is assumed that, when obtaining of the term information failed, another website is selected to perform dictionary search, however, dictionary search may be performed in a plurality of websites from the first and images with term information including a plurality of term information and document images obtained as the result thereof may be generated in generation processing of an image with term information which will be described below. In such a case, in the term information display areas 62a to 62c of the layout 60 shown in FIG. 9, term information obtained as the result of performing dictionary search for the same keyword in different websites is displayed.

In the case where another website is not registered in the website information 22b (in the case of NO at step S140), or in the case where obtaining of term information is completed successfully at step S139 (in the case of YES at step S139), the information obtaining portion 23 stores information of the search result in the storage portion 22 as the term information 22d (step S141). Here, the information of the search result is information output from the website in the case of failure of the search, or term information output from the website when the obtaining is completed successfully.

The information obtaining portion 23 thereafter determines whether or not searches for all the keywords extracted from a document image are finished (step S142). When the search of all the keywords are not finished (in the case of NO at step S142), the process shifts to step S137 and the information obtaining portion 23 inputs a keyword which has not yet been searched in a keyword input field for dictionary search on the website, then continues subsequent processing.

When the searches for all the keywords are finished (in the case of YES at step S142), the image forming portion 24 generates image data with term information (step S143). Specifically, the image forming portion 24 generates image data for printing having the layout 60 decided at step S122 of FIG. 4, or having the layout 60 changed at step S134 of FIG. 5. For example, in the document image display area 61 in the layout 60 shown in FIG. 9, the document image read at step S116 of FIG. 4 is arranged, and in the term information display areas 62a to 62c, the term information obtained at step S138 is arranged.

Subsequently, the image forming portion 24 displays a preview image of the generated image data with term information on the display portion 18a (step S144). The image forming portion 24 thereafter determines whether or not a process instruction of the image data with term information is received from a user through the operation portion 18b (step S145). When the process instruction of the image data with term information is received from the user (in the case of YES at step S145), the image forming portion 24 displays, on the display portion 18a, an area specification receiving screen for receiving specification of an area to be included in the image data with term information from the user so as to receive the specification of the area from the user through the operation portion 18b (step S146).

Figure 12:
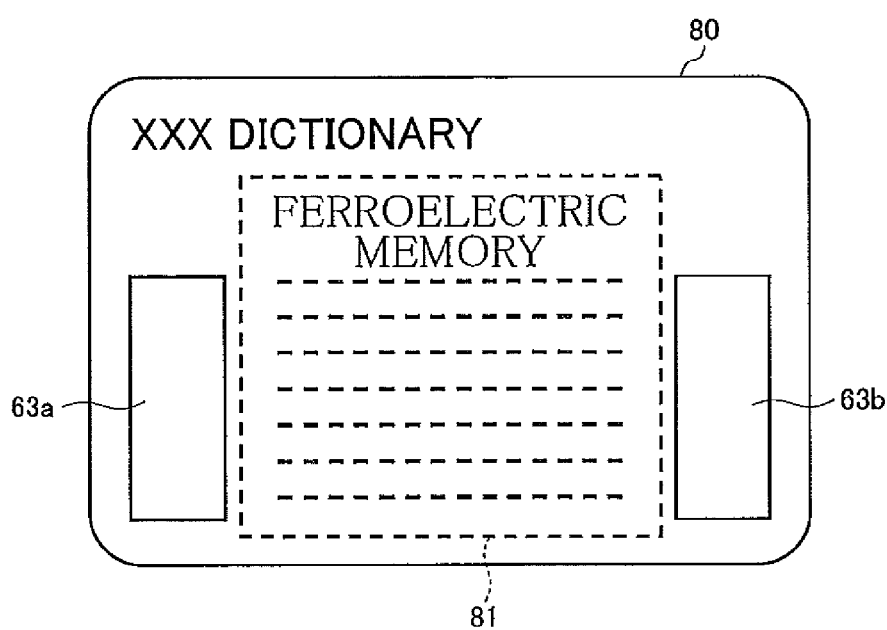
FIG. 12 is a diagram showing an example of an area specification receiving screen receiving specification of an area to be included in image data with term information.

FIG. 12 is a diagram showing an example of an area specification receiving screen 80 for receiving specification of an area to be included in image data with term information. The area specification receiving screen 80 is a screen for displaying term information output as the result of dictionary search from a website. On the area specification receiving screen 80, unnecessary information such as a name of the website "XXX dictionary" or advertisements 63a, 63b are included, for example. A user is able to exclude the areas in which the name of the website "XXX dictionary" or the advertisements 63a, 63b are displayed by specifying an area 81 in which meaning, a translation and an explanation of a term are displayed on the area specification receiving screen 80.

Note that, in the example of FIG. 12, although the area specification receiving screen 80 for the term information display area 62a of FIG. 9 is displayed, after specification of an area for the term information display area 62a is performed by the user on the area specification receiving screen 80, the image forming portion 24 causes the display portion 18a to display the area specification receiving screen 80 for the term information display areas 62b and 62c sequentially so as to receive specification of the area to be included in the image data with term information from the user.

Returning to the explanation of FIG. 6, after step S146, the image forming portion 24 extracts term information from information in the area specified by the user to process the term information (step S147). The process then shifts to step S143 and the image forming portion 24 generates image data with term information from the processed term information and the document image read at step S116 of FIG. 4, and continues subsequent processing.

Figure 13:
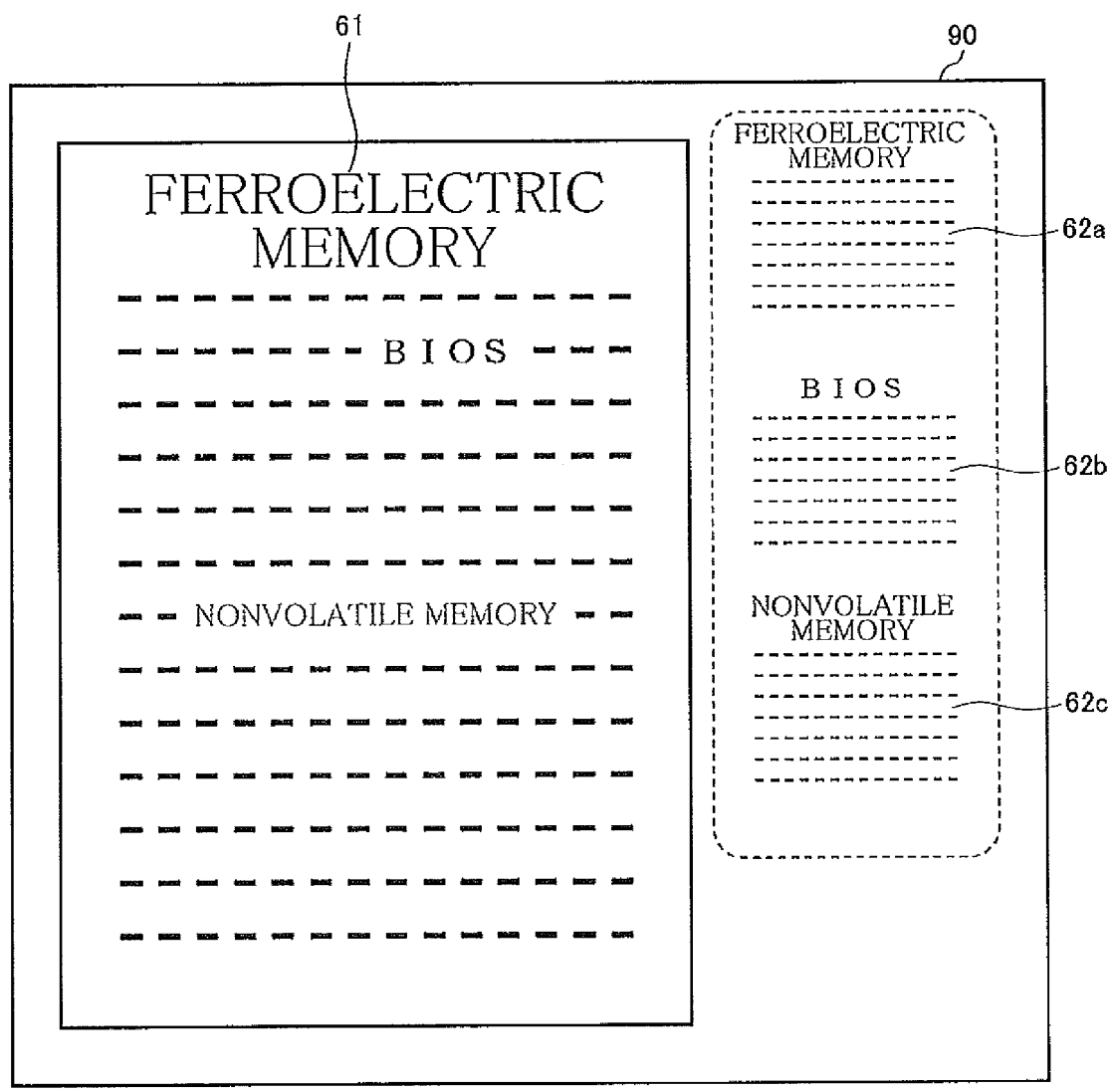
FIG. 13 is a diagram showing an example of image data with term information including term information after processing.

FIG. 13 is a diagram showing an example of image data with term information 90 including term information after processing. In the image data with term information 90, the document image display area 61 and the term information display areas 62a to 62c are included. Then, in the term information display areas 62a to 62c, term information from which the name of the website "XXX dictionary" and the advertisements 63a to 63f shown in FIG. 9 are excluded is displayed. In this way, by generating the image with term information from which unnecessary information is excluded, the document image and the term information are able to be displayed in larger size so as to make the image with term information easily viewable.

Returning to the explanation of FIG. 6, when the process instruction of the image data with term information is not received from the user at step S145 of FIG. 6 (in the case of NO at step S145), the image forming portion 24 prints the image data with term information generated at step S143 (step S148). The image forming processing is then finished.

As described above, the description has been given mainly for the embodiments of an image forming apparatus and an image forming method, however, the present invention is not limited to these embodiments, and the present invention may be performed in a form as a computer program for realizing a function of the image forming apparatus or a form of a computer-readable recording medium having the computer program recorded therein.

Here, the recording medium may be employed in various forms of a disk type (for example, a magnetic disk, an optical disk and the like), a card type (for example, a memory card, an optical card and the like), a semiconductor memory type (for example, a ROM, a nonvolatile memory and the like), a tape type (for example, a magnetic tape, a cassette tape and the like), and the like.

A computer program for realizing a function of the image forming apparatus or a computer program for causing a computer to execute a content display method in the above described embodiments is recorded in the recording medium for distribution, thereby making it possible to reduce costs and improve portability or versatility.

In addition, the above described recoding medium is mounted to a computer, a computer program recorded in the recording medium is read out by the computer and stored in a memory, and the computer program is read out from the memory and executed by a processor (CPU: Central Processing Unit, MPU: Micro Processing Unit) provided in the computer, so that it is possible to realize a function of the image forming apparatus and to execute the image data processing method according to the present embodiments.

Moreover, the present invention is not limited to the above described embodiments and various modifications and alterations can be made within the scope without departing from the spirit of the present invention. For example, in the above-described embodiment, it is assumed that the information obtaining portion 23 sets a term included in an area specified by a user or a term in a character string that corresponds to a character string input by a user as a keyword for dictionary search, however, the information obtaining portion 23 may extract a term in an area specified by a user by enclosing in parentheses or by enclosing in a circle, or a term in a character string specified by underlining so as to set the extracted term as the keyword for dictionary search. In this case, the information obtaining portion 23 detects the position of the parentheses, the underline or the circle by means of character recognition and image reading processing to extract the term enclosed in the parentheses, the term underlined, or the term enclosed in the circle. The information obtaining portion 23 then sets the extracted term as the keyword for dictionary search. The user is thereby able to easily specify a keyword for performing dictionary search by describing an underline, parentheses, or a circle in a printed matter.

Hereinabove, according to the present invention, a document image is read, character recognition of a term included in the read document image is performed, access is gained to a website for performing dictionary search through a network so that information of a search result of the dictionary search performed with the term recognized in the character recognition as a keyword is obtained as term information, and based on the obtained term information, an image with term information including the term information and the document image is formed, so that when there is an unknown term or a term for which a translation is unknown in a document, meaning, a translation and an explanation of the term are able to be easily obtained by a user, while the meaning, the translation and the explanation of the term are left as a record, thereby making it possible to use the record afterwards so as to increase convenience for the user.

The invention claimed is:

1. An image forming apparatus for forming an image, comprising:
   an image reading portion for reading a document image;
   a character recognition portion for performing character recognition of a term included in the document image read by the image reading portion;
   an information obtaining portion for gaining access to a website for performing dictionary search through a network so as to obtain, as term information, information of a search result of the dictionary search performed with the term recognized by the character recognition portion as a keyword; and
   an image forming portion for forming an image with term information including the term information and the document image based on the term information obtained by the information obtaining portion wherein the information obtaining portion sets a term satisfying a condition specified by a user as the keyword.

2. The image forming apparatus as defined in claim 1, wherein
   the condition includes at least one of conditions including area specification, character string specification, typeface specification, character size specification, and character color specification of the term.

3. The image forming apparatus as defined in claim 1, further comprising:
   a storage portion for storing identification information for identifying a user and an address of the website in association with each other; and
   a user authentication portion for authenticating the user, wherein
   the information obtaining portion reads out the address of the website corresponding to the user authenticated by the user authentication portion from the storage portion, and gains access to the website based on the read address.

4. The image forming apparatus as defined in claim 1, wherein
   the image forming portion forms an image with term information that includes one page of the document image and the term information of the term included in the one page of the document image in one page.

* * * * *